United States Patent
Pstrocki-Porras et al.

(10) Patent No.: US 12,166,938 B2
(45) Date of Patent: Dec. 10, 2024

(54) METHOD AND APPARATUS TO GENERATE ENCRYPTED CODES ASSOCIATED WITH A DOCUMENT

(71) Applicant: Xerox Corporation, Norwalk, CT (US)

(72) Inventors: Sanja Pstrocki-Porras, Rochester, NY (US); Dianne Colelli, Webster, NY (US); Mirelsa Fontanes-Perez, Webster, NY (US); Cheryl A. Nazzaro, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/395,404

(22) Filed: Dec. 22, 2023

(65) Prior Publication Data
US 2024/0179261 A1    May 30, 2024

Related U.S. Application Data

(63) Continuation of application No. 17/653,519, filed on Mar. 4, 2022, now Pat. No. 11,856,172.

(51) Int. Cl.
G06F 15/00 (2006.01)
H04N 1/32 (2006.01)

(52) U.S. Cl.
CPC ..... *H04N 1/32112* (2013.01); *H04N 1/32117* (2013.01); *H04N 2201/3281* (2013.01)

(58) Field of Classification Search
None
See application file for complete search history.

(56) References Cited

U.S. PATENT DOCUMENTS

| | | |
|---|---|---|
| 2004/0133636 A1 | 7/2004 | Kinoshita |
| 2009/0159658 A1 | 6/2009 | Cheung |
| 2012/0278616 A1 | 11/2012 | Stevens |
| 2014/0045472 A1 | 2/2014 | Sharma |
| 2014/0061293 A1 | 3/2014 | Jayaprakash |
| 2015/0288670 A1 | 10/2015 | Bhooshan |
| 2022/0191336 A1 | 6/2022 | Rahamathjan |

*Primary Examiner* — Mark R Milia

(57) ABSTRACT

A multi-function device (MFD) is disclosed. For example, the MFD includes a communication interface to establish a communication path with a remote server, a user interface to receive a request to create an electronic file based on a scan of a document, a processor, and a non-transitory computer-readable medium storing a plurality of instructions. The instructions when executed by the processor cause the processor to scan the document to create the electronic file of the document, generate an encryption code associated with the electronic file of the document that is scanned, and transmit the electronic file to the remote server.

20 Claims, 6 Drawing Sheets

METHOD AND APPARATUS TO GENERATE ENCRYPTED CODES ASSOCIATED WITH A DOCUMENT

CROSS REFERENCE TO RELATED APPLICATIONS

This application is a continuation of U.S. patent application Ser. No. 17/653,519, filed on Mar. 4, 2022, now U.S. Pat. No. 11,856,172, which is hereby incorporated by reference in its entirety.

FIELD OF THE DISCLOSURE

The present disclosure relates generally to document security and relates more particularly to a method and apparatus to generate an encrypted code associated with a document that can be used to read or print the document.

BACKGROUND

Documents can be generated on a multi-function device (MFD). A document can be printed and then scanned via the MFD to generate an electronic file of the document. The electronic file can then be transmitted, via email, to other users to share the document. In other examples, the electronic file can be stored on a server to be accessed by other MFDs at different locations.

SUMMARY

According to aspects illustrated herein, there are provided a multi-function device (MFD) and a method for generating an encryption code associated with a document. One disclosed feature of the embodiments is an MFD that comprises a communication interface to establish a communication path with a remote server, a user interface to receive a request to create an electronic file based on a scan of a document, a processor, and a non-transitory computer-readable medium storing a plurality of instructions. The instructions when executed by the processor cause the processor to scan the document to create the electronic file of the document, generate an encryption code associated with the electronic file of the document that is scanned, and transmit the electronic file to the remote server.

Another disclosed feature is a method for generating an encryption code associated with a document. The method executed by a processor of the MFD comprises receiving, via a multi-function device (MFD), a request to generate an encryption code for an electronic file of a document, scanning the document on the MFD to generate the electronic file of the document, generating the encryption code associated with the electronic file of the document, transmitting the electronic file of the document to a remote server to be stored, and providing the encryption code to a user to allow the user to retrieve the electronic code via the encryption code.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for generating an encrypted code associated with a document. As discussed above, documents can be generated on a multi-function device (MFD). A document can be printed and then scanned via the MFD to generate an electronic file of the document. The electronic file can then be transmitted, via email, to other users to share the document. In other examples, the electronic file can be stored on a server to be accessed by other MFDs at different locations.

However, some documents can be very large in terms of file size. The documents can include several hundred pages with detailed images and/or graphics that can cause the documents to be several hundreds of megabytes. Thus, the documents may not be able to be transmitted via email. In addition, printing several copies of the documents may be expensive due to the amount of paper and ink that is consumed to print the documents.

The present disclosure provides an apparatus and method to generate an encrypted code associated with a document when the document is scanned at an MFD. The encrypted code may be a pointer that includes a link to the electronic document saved in a server. The encrypted code can be transmitted to the author of the document when the document is scanned at the MFD. The encrypted code can be used by the author to access the document.

In addition, the author may share the encrypted code with other users to share the document, rather than email the document to the other users. The encrypted code may include authorization data and a location of the document. The encrypted code may consume much less memory than the document itself. Thus, the encrypted code can be easily shared via email, text message, and the like with other users. The other users may then scan the encrypted code with their devices or have an MFD scan the code to access the document. The other users can then easily read the document or print the document at the MFD.

Figure 1:
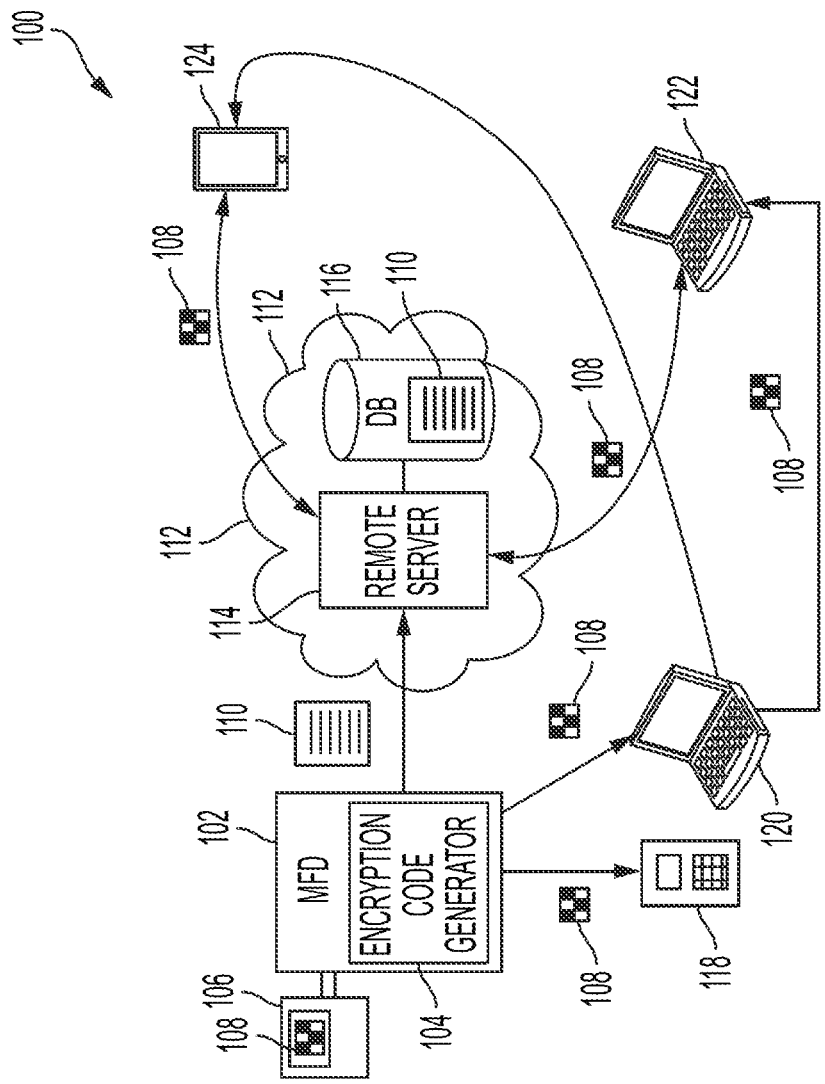
FIG. 1 illustrates a block diagram of an example network that includes a multi-function device (MFD) to generate encrypted codes associated with a document of the present disclosure.

FIG. 1 illustrates an example network 100 of the present disclosure. In one embodiment, the network 100 may include an apparatus 102, an Internet protocol (IP) network 112, a remote server 114, and a database (DB) 116. The apparatus 102 may be a multi-function device (MFD). For example, the apparatus 102 may be able to perform print, copy, fax, scan, and email document functions.

In one embodiment, the IP network 112 may be any type of communication network that can transfer data using internet protocols. The IP network 112 may be the Internet, for example. The IP network 112 has been simplified for ease of explanation and may include additional network elements that are not shown. For example, the IP network 112 may include firewalls, gateways, switches, border elements, access networks, and the like.

In one embodiment, the apparatus 102 may include an encryption code generator 104. For example, the apparatus 102 may include hardware and/or software to generate an encryption code 108 associated with an electronic file 110 of a document. The encryption code 108 may include an IP address of the remote server 114, a pointer that provides a location of the electronic file 110 in the DB 116, authentication information, and the like. As discussed in further detail below, the encryption code 108 can be used to access the electronic file 110 from another endpoint device, from the MFD 102, or from another remotely located MFD to read or print out the document in the electronic file 110. Thus, large documents that are saved as large electronic files 110 can be easily shared or accessed from various endpoint devices without having to send large attachments or files via email or other communication methods.

In one embodiment, a user may scan a physical document (e.g., a document on physical paper) using the MFD 102. The MFD 102 may generate the electronic file 110 associated with the physical document. The electronic file 110 may be transmitted to the remote server 114. The electronic file 110 may be stored in the DB 116 at a particular location. The remote server 114 may provide a pointer or location information of where the electronic file 110 is stored in the DB 116 to the MFD 102. The MFD 102 may then include the pointer or location information of the electronic file 110 and an IP address of the remote server 114 in the encryption code 108.

The encryption code generator 104 may generate the encryption code 108 associated with the electronic file 110. The encryption code 108 may include the pointer and IP address of the remote server 114. In one embodiment, the encryption code 108 may also include authentication information. For example, the user may include a list of authorized usernames and/or passwords of other users who can access the electronic file 110.

In one embodiment, the encryption code 108 may be any type of machine readable code. The encryption code 108 may be a quick response code, a bar code, and the like. The encryption code 108 may be presented to the user in a variety of different ways.

In one embodiment, the encryption code 108 may be presented to a user on a display 106 of the MFD 102. The user may then capture an image of the encryption code 108 using his or her endpoint device (e.g., a mobile device 118). In one embodiment, the encryption code 108 may be printed out via the MFD 102. The user may then have a physical printed copy of the encryption code 108.

In one embodiment, the encryption code 108 may be transmitted to an endpoint device of the user. For example, the encryption code 108 may be emailed to a computer 120 of the user (e.g., a desktop computer or a laptop computer). In one embodiment, the encryption code 108 may be transmitted via a text message to a mobile device 118 of the user.

The user may then share the encryption code 108 with other users. For example, the user may email or text the encryption code 108 to the endpoint devices 122 and 124. In another example, the user may make copies of the printed encryption code 108 to provide to the other users.

The other users may then access the electronic file 110 using the encryption code 108. For example, the other users may provide the encryption code 108 to the remote server 114 to access the electronic file 110. The other users can then read the electronic file 110 on their endpoint devices 122 or 124.

In one embodiment, the other users may present the encryption code 108 to the MFD 102 or to another remotely located MFD to access the electronic file 110. The other users can then either read the electronic file 110 on the MFD 102 or on the remotely located MFD, or print out the document at the MFD 102 or at the remotely located MFD.

In one embodiment, the other users may present respective usernames and passwords to the remote server 114 or the MFD 102 to access the electronic file 110. The users may be authenticated against the authentication or list of authorized users stored in the encryption code 108. If the other users are authorized, they may read or print out the electronic file 110.

Thus, the encryption code 108 may be used to share large documents that are stored as large electronic files 110. Some email programs may be unable to transmit large electronic files 110 as attachments. The encryption code may also be more secure than a hyperlink to an electronic file stored in a cloud storage service. In an example, the encryption code 108 may be a unique encryption code that can only be read by an encryption code reader on the MFD 102 or by the remote server 114. Thus, the encryption code 108 may provide an efficient and secure way to access large electronic files 110 remotely by various users rather than trying to send large attachments or print out large documents that have to be carried and passed out to other users.

Figure 2:
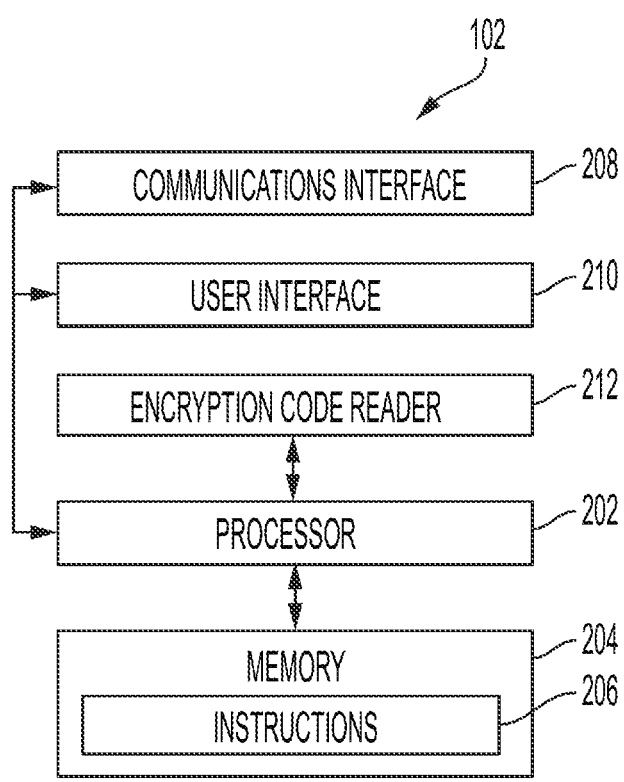
FIG. 2 illustrates a block diagram of an example MFD of the present disclosure.

FIG. 2 illustrates a block diagram of an example of the apparatus 102. In one embodiment, the apparatus 102 may include a processor 202, a memory 204, a communication interface 208, a user interface 210, and an encryption code reader 212. The processor 202 may be communicatively coupled to the memory 204, the communication interface 208, user interface 210, and the encryption code reader 212. The processor 202 may control operation of and/or transmit/receive data via the communication interface 208, the user interface 210, and/or the encryption code reader 212.

In one embodiment, the communication interface 208 may be to establish a communication path between the apparatus 102 and the remote server 114 of FIG. 1 via the IP network 112. For example, the communication interface 208 may be a wireless or wired communication interface. For example, the communication interface 208 may be a WiFi radio, an Ethernet connection, a fax over IP connection that uses an RJ-111 connection, a cellular radio, and the like.

In one embodiment, the user interface 210 may be a graphical user interface (GUI). The user interface 210 may be a touch screen interface or may be a GUI that receives inputs via a keyboard, mouse, a trackpad, and the like. The user interface 210 may provide prompts and/or data fields for a user to request to scan a document to generate an electronic file and a corresponding encryption code associated with the electronic file. The user interface 210 may also be used to provide a list of authorized users (e.g., usernames and passwords of the authorized users).

In one embodiment, the encryption code reader 212 may be used to read the encryption code 108 of FIG. 1. As noted above, the encryption code 108 may be a code that can only be read by the encryption code reader 212. Thus, the electronic file 110 may only be accessed by the MFD 102 with the encryption code reader 212.

In one embodiment, the memory 204 may be any type of non-transitory computer readable medium. For example, the memory 204 may be a hard disk drive, a solid state drive, a random access memory, a read only memory, and the like. The memory 204 may store instructions 206.

In one embodiment, the instructions 206 may be executed by the processor 202 to perform the functions described herein to generate an encrypted code associated with a document and to access a document associated with an encrypted code. The instructions 206 may be used to execute the encryption code generator 104 of FIG. 1. For example, the instructions 206 may cause the processor to perform operations of the method 400 illustrated in FIG. 4, and discussed in further detail below, and the operations of method 500 illustrated in FIG. 5, and discussed in further detail below.

Figure 3:
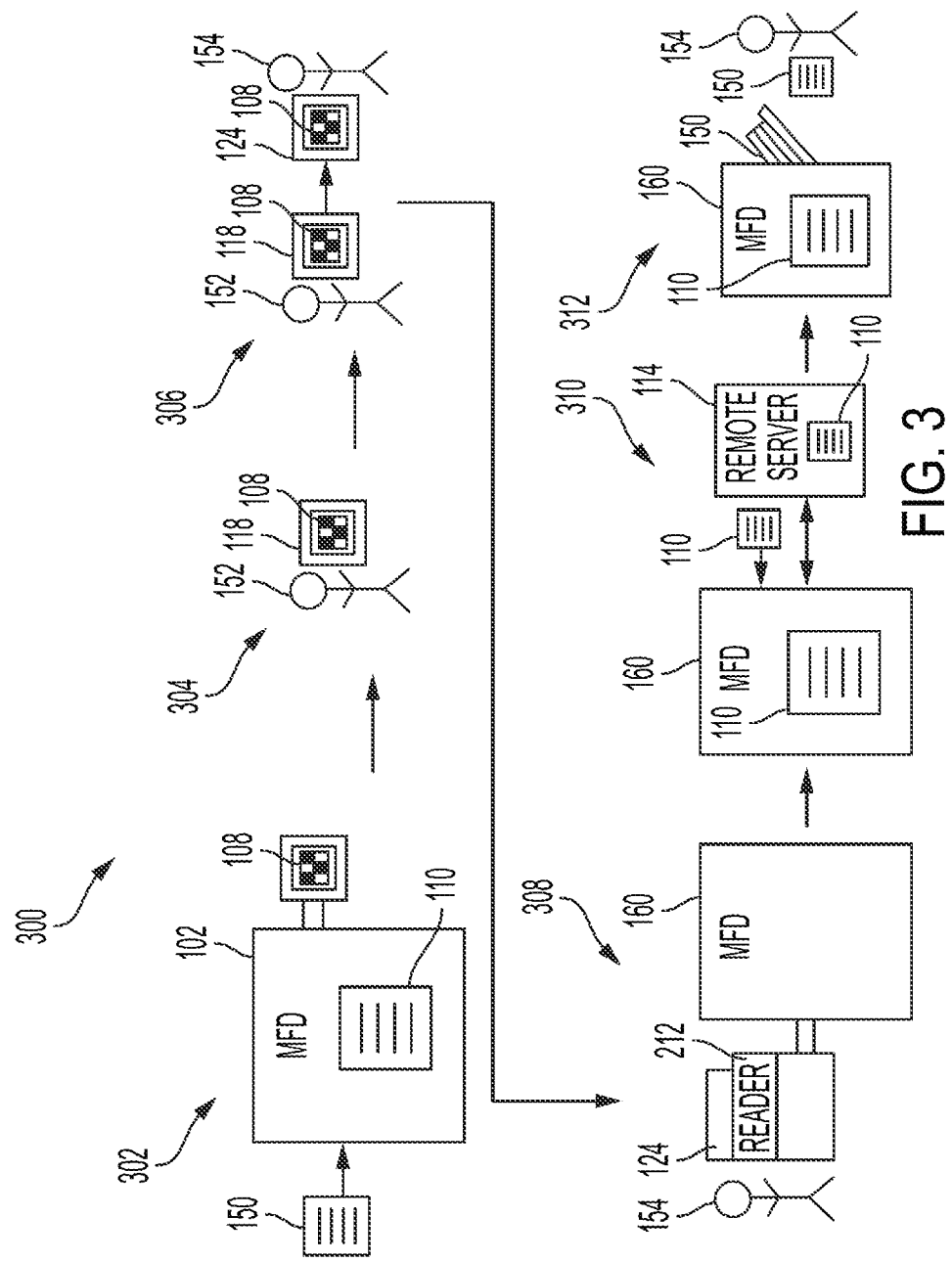
FIG. 3 illustrates a block diagram of an example process flow of generating an encrypted code associated with a document of the present disclosure.

FIG. 3 illustrates an example process flow 300 of a method of generating an encryption code 108 and using the encryption code 108 to access an electronic file 110. The process flow 300 begins at block 302. At block 302, the MFD 102 may receive a physical document 150 to be scanned and converted into the electronic file 110. The physical document 150 may be a large file (e.g., several hundred pages) with graphics and images. The electronic file 110 of the physical document 150 may be a large file (e.g., several hundred megabytes or gigabytes). Thus, transmitting the electronic file 110 to other users via email may be difficult, if not impossible.

The MFD 102 may generate the encryption code 108 that is associated with the electronic file 110 and may transfer the electronic file 110 to a remote server for storage. The encryption code 108 may include an IP address of the remote server that stores the electronic file 110, a pointer or location information of the electronic file 110, and a list of authorized users or authentication information.

At block 304, a user 152 may receive the encryption code 108 on a mobile device 118 of the user 152. The user 152 may be the author of the physical document 150 and the user who submitted the scan job request on the MFD 102 to scan the physical document 150 into the electronic file 110.

As noted above, the user 152 may obtain the encryption code 108 via a variety of different ways. The user 152 may capture a picture of the encryption code 108 that is shown on the display 106 of the MFD 102. The user 152 may receive the encryption code 108 via a text message or an email.

At block 306, the user 152 may then share the encryption code 108 with a user 154. For example, the user 152 may send the encryption code 108 by text message or email to the endpoint device 124 of the user 154. The user 154 may be an authorized user who is included in the list of authorized users stored in the encryption code 108.

At block 308, the user 154 may then take the endpoint device 124 to a remotely located MFD 160. The MFD 160 may be a different device than the MFD 102 where the electronic file 110 was generated.

In one embodiment, the MFD 160 may include an encryption code reader 212. The user 154 may place the encryption code 108 shown on the endpoint device 124 onto the encryption code reader 212. The encryption code reader 212 may read the encryption code 108 and provide the information contained in the encryption code 108 to the MFD 160.

In one embodiment, the MFD 160 may ask the user 154 for a username and password if authentication is required. The user 154 may provide a username and password on the user interface 210 of the MFD 160.

The MFD 160 may then match the username and password to the list of authorized users obtained from the encryption code 108. If the user 154 is authorized, the process flow 300 may proceed to block 310.

At block 310, the MFD 160 may establish a communication session with the remote server 114. The MFD 160 may contact the remote server 114 using the IP address contained in the encryption code 108. The MFD 160 may provide the pointer or location information to the remote server 114. The remote server 114 may locate the electronic file 110 in memory or in the DB 116 and may transmit the electronic file 110 to the MFD 160.

In one embodiment, the electronic file 110 may be transmitted to the MFD 160. In other words, a copy of the electronic file 110 may be transmitted and stored temporarily in local memory of the MFD 160. In another embodiment, the remote server 114 may transmit electronic information of each page that is viewed on the MFD 160. In other words, the remote server 114 may transmit information page-by-page as the user 154 reads a page on the display of the MFD 160 without transmitting the entire electronic file 110.

At block 312, the user 154 may submit a job request to print out the electronic file 110 at the MFD 160. The remote server 114 may transmit the entire electronic file 110 for printing or may provide the printer document language (PDL) information associated with the electronic file 110 for printing in response to the print job request to minimize the amount of bandwidth consumed.

The MFD 160 may then print out a physical copy 150 of the electronic file 110. Thus, the user 154 may access the electronic file 110 to read and/or print at the remotely located MFD 160 using the encryption code 108. Notably, the user 154 never has a copy of the electronic file 110. Rather, the user 154 receives the encryption code 108 from the author of the electronic file 110. The encryption code 108 does not provide a hypertext link that can be accessed from any endpoint device. Rather, the encryption code 108 is presented to the MFD 102, MFD 160, or the remote server 114 to access the electronic file 110.

Figure 4:
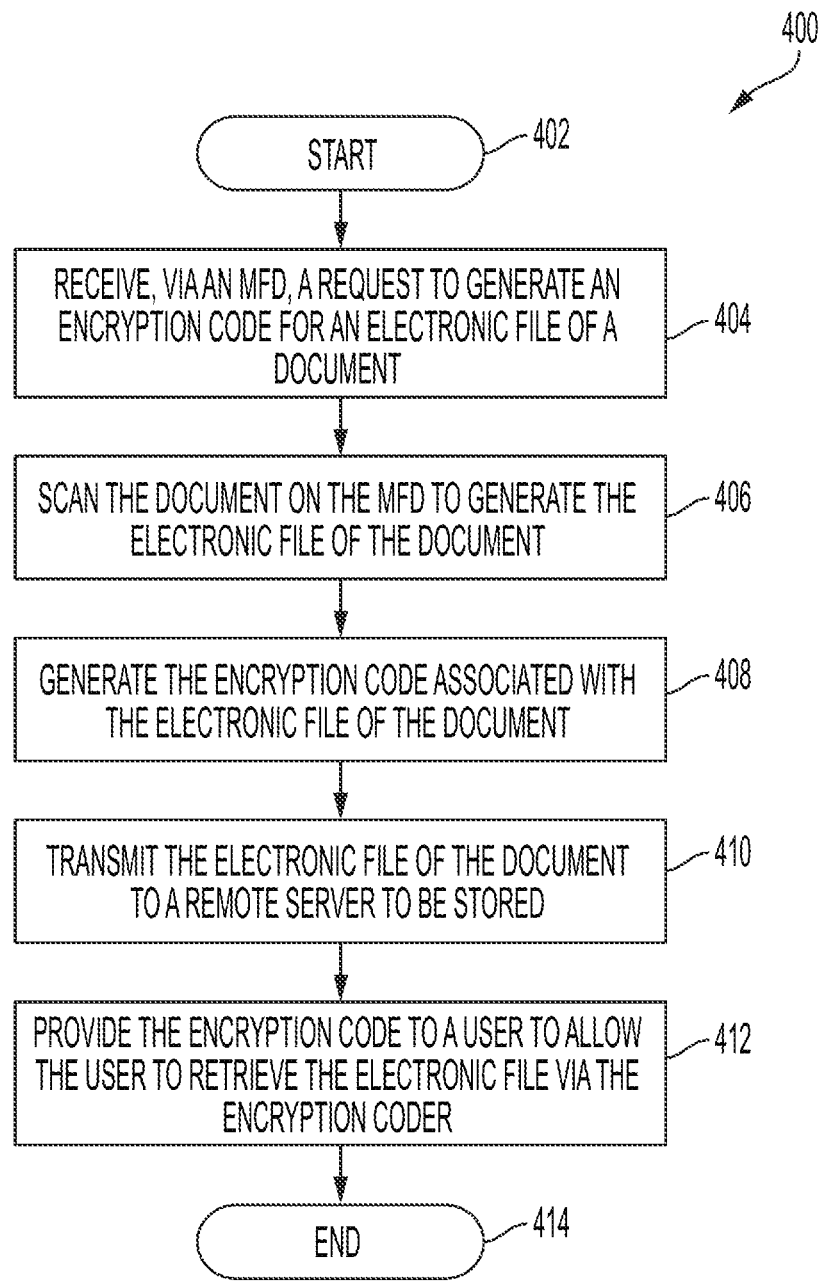
FIG. 4 illustrates a flow chart for a method of generating an encrypted code associated with the document of the present disclosure.

FIG. 4 illustrates a flow chart of an example method 400 for a generating an encrypted code associated with a document of the present disclosure. In one embodiment, the method 400 may be performed by the apparatus 102 or by an apparatus such as the apparatus 600 illustrated in FIG. 6 and discussed below.

In one embodiment, the method 400 begins at block 402. At block 404, the method 400 receives, via a multi-function device (MFD), a request to generate an encryption code for an electronic file of a document. For example, generating the encryption code may be a selectable option for when documents are scanned to create an electronic file.

In one embodiment, the encryption code may be generated automatically if the electronic file of the document will be greater than a memory size threshold. For example, the threshold may be a size limit associated with size attachments for emails. For example, the memory size threshold may be 100 megabytes. If the electronic file that is generated is greater than 100 megabytes, the encryption code may be automatically generated for the electronic file of the document that is scanned.

In one embodiment, encryption codes may be automatically generated for all electronic files of documents that are scanned. Thus, the user may have the option to share the electronic file or the encryption code.

At block 406, the method 400 scans the document on the MFD to generate the electronic file of the document. Once the scan job request and the request to generate the encryption file are submitted, the MFD may scan the document.

At block 408, the method 400 generates the encryption code associated with the electronic file of the document. The encryption code may include an IP address of a remote server that is to store the electronic file. The encryption code may also include a pointer or location information of the electronic file in a database of the remote server. For example, the MFD may transmit the electronic file to the remote server, and the remote server may provide the pointer information of where the electronic file is located in the database back to the MFD.

In one embodiment, the user may provide a list of authorized users. The authentication information for the authorized users may be provided to the MFD. The encryption code may include the authentication information for the list of authorized users. Authentication information may be a selectable option that can be selected via the user interface of the MFD.

At block 410, the method 400 transmits the electronic file of the document to a remote server to be stored. Thus, the electronic file may be accessed by the user or by other users who have the encryption code via their respective endpoint devices, via remotely located MFDs, or via the MFD that generated the encryption code and electronic file.

At block 412, the method 400 provides the encryption code to a user to allow the user to retrieve the electronic file via the encryption code. In one embodiment, the encryption code may be provided via a display to the user. The user may then capture an image of the encryption code with a camera on his or her mobile endpoint device. In one embodiment, the encryption code may be printed out via the MFD onto paper. The user may then have a physical printed copy of the encryption code.

In one embodiment, the encryption code may be provided by transmitting the encryption code to an endpoint device of the user. For example, the encryption code may be emailed to a computer of the user (e.g., a desktop computer or a laptop computer). In one embodiment, the encryption code may be transmitted via a text message to a mobile device of the user.

The user may then share the encryption code with other users. For example, the user may email or text the encryption code to the endpoint devices of the other users, make a copy of the printed encryption code, share the picture of the encryption code that was captured, and so forth. At block 414, the method 400 ends.

Figure 5:
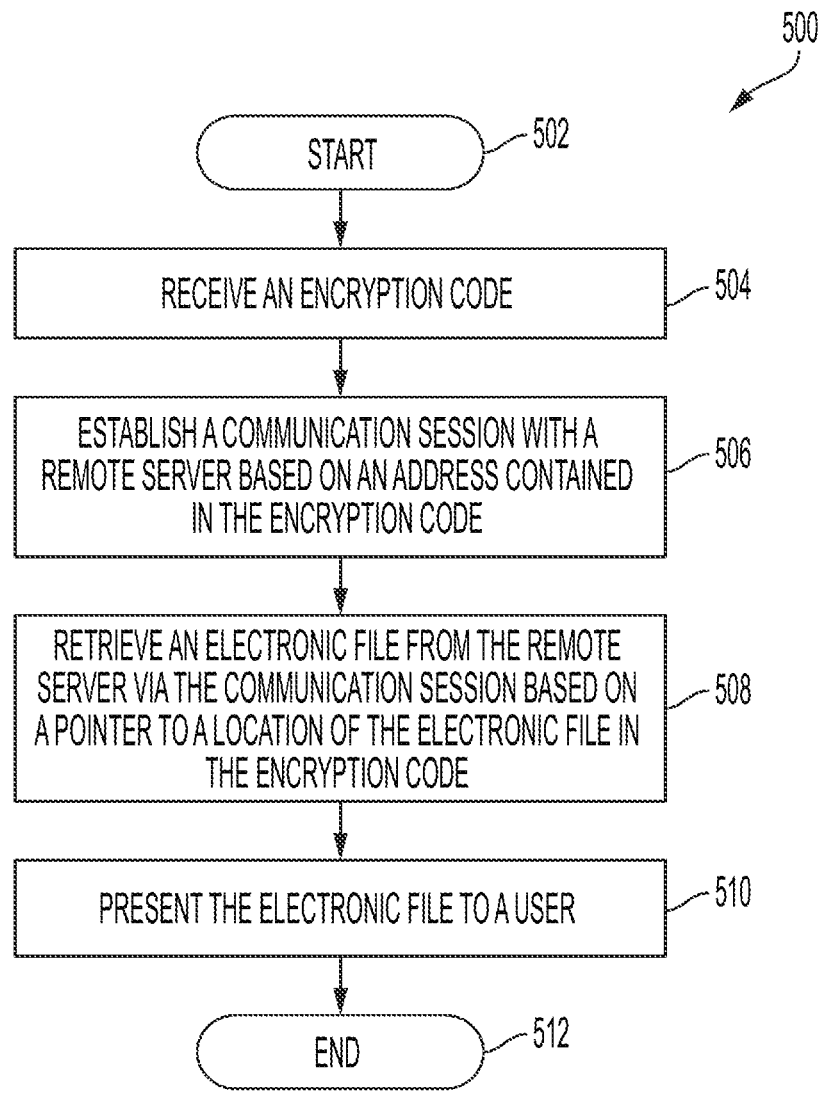
FIG. 5 illustrates a flow chart for a method of accessing a document associated with an encrypted code of the present disclosure.

FIG. 5 illustrates a flow chart of an example method 500 for accessing a document associated with an encrypted code of the present disclosure. In one embodiment, the method 500 may be performed by the apparatus 102 or by an apparatus such as the apparatus 600 illustrated in FIG. 6 and discussed below.

In one embodiment, the method 500 begins at block 502. At block 504, the method 500 receives an encryption code. For example, a user may place the encryption code on an encryption code reader of an MFD. The MFD may then decipher the information contained in the encryption code.

At block 506, the method 500 establishes a communication session with a remote server based on an address contained in the encryption code. For example, the MFD may establish a wired or wireless communication session with the remote server.

At block 508, the method 500 retrieves an electronic file from the remote server via the communication session based on a pointer to a location of the electronic file in the encryption code. For example, a copy of the electronic file may be transmitted to the MFD or the endpoint device of the user, or data for each page of the electronic file may be transmitted to the MFD or endpoint device of the user as the user accesses each page of the electronic file.

At block 510, the method 500 presents the electronic file to a user. The user may then read the electronic file. In one embodiment, the user may print out a copy of the document in the electronic file on the MFD. For example, once the MFD has access to the electronic file, the user may submit a print job request to print a copy or multiple copies of the electronic file.

In one embodiment, after the encryption code is no longer detected by the MFD, the MFD may end the communication session with the remote server and delete any temporary copies or electronic information associated with the electronic file stored on the MFD. For example, the user may remove the endpoint device from the encryption reader of the MFD. The MFD may then stop access to the electronic file and disconnect from the remote server. At block 512, the method 500 ends.

Figure 6:
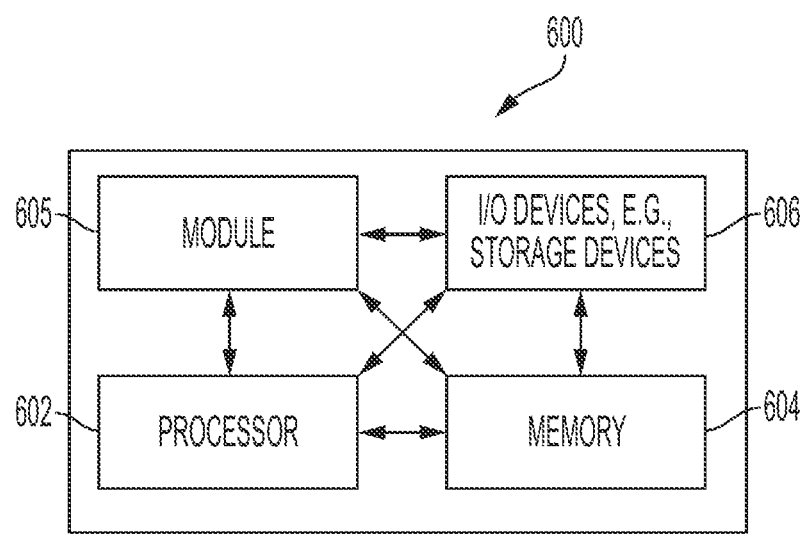
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for generating an encrypted code associated with a document, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for generating an encrypted code associated with a document (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for generating an encrypted code associated with a document (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD) comprising:
   an encryption code reader to read an encryption code generated by a remotely located MFD that scanned a document to create an electronic file associated with the document, wherein the encryption code allows access to only read or print the electronic file from the MFD or a remote server;
   a processor; and
   a non-transitory computer-readable medium storing a plurality of instructions, which when executed by the processor, causes the processor to perform operations comprising:
   receiving the encryption code via a scan of the encryption code by the encryption code reader;
   establishing a communication session with the remote server;
   retrieving the electronic file from the remote server via the communication session; and
   presenting the electronic file on the MFD.

2. The MFD of claim 1, further comprising:
   a display to present the electronic file to a user.

3. The MFD of claim 1, wherein the encryption code includes a list of authorized users.

4. The MFD of claim 3, wherein the operations further comprising:
   receiving a username and a password from a user; and
   determining that the user is an authorized user included in the list of authorized users based on the username and password that are received.

5. The MFD of claim 1, wherein the encryption code comprises an address of the remote server and a pointer to a location of the electronic file in the remote server.

6. The MFD of claim 1, wherein the retrieving comprises:
   receiving the electronic file page-by-page from the remote server as a user reads a page on a display of the MFD.

7. The MFD of claim 1, further comprising:
   receiving a job request to print the electronic file at the MFD; and
   receiving a printer document language information associated with the electronic file from the remote server to execute the job request.

8. The MFD of claim 1, further comprising:
   determining that the encryption code is no longer detected by the MFD; and
   deleting any electronic information associated with the electronic file from the non-transitory computer-readable medium of the MFD.

9. The MFD of claim 1, wherein the encryption code is scanned by the encryption code reader from a print out of the encryption code reader or a display of an endpoint device of a user.

10. A method comprising:
    receiving, by a processor of a multi-function device (MFD), an encryption code generated by a remotely located MFD that scanned a document to create an electronic file associated with the document via a scan of the encryption code by an encryption code reader of the MFD;
    establishing, by the processor, a communication session with a remote server;
    retrieving, by the processor, the electronic file from the remote server via the communication session; and
    presenting, by the processor, the electronic file on the MFD.

11. The method of claim 10, wherein the encryption code includes a list of authorized users.

12. The method of claim 11, further comprising:
    receiving, by the processor, a username and a password from a user; and
    determining, by the processor, that the user is an authorized user included in the list of authorized users based on the username and password that are received.

13. The method of claim 10, wherein the encryption code comprises an address of the remote server and a pointer to a location of the electronic file in the remote server.

14. The method of claim 10, wherein the retrieving comprises:
    receiving, by the processor, the electronic file page-by-page from the remote server as a user reads a page on a display of the MFD.

15. The method of claim 10, further comprising:
    receiving a job request to print the electronic file at the MFD; and
    receiving a printer document language information associated with the electronic file from the remote server to execute the job request.

16. A non-transitory computer readable medium storing instructions, which when executed by a processor of a multi-function device (MFD), the instructions cause the processor to:
    receive an encryption code generated by a remotely located MFD that scanned a document to create an electronic file associated with the document via a scan of the encryption code by an encryption code reader of the MFD;
    establish a communication session with a remote server;
    retrieve the electronic file from the remote server via the communication session; and
    present the electronic file on the MFD.

17. The non-transitory computer readable medium of claim 16, wherein the encryption code includes a list of authorized users.

18. The non-transitory computer readable medium of claim 17, wherein the processor is further to:
    receive a username and a password from a user; and
    determine that the user is an authorized user included in the list of authorized users based on the username and password that are received.

19. The non-transitory computer readable medium of claim 16, wherein the encryption code comprises an address of the remote server and a pointer to a location of the electronic file in the remote server.

20. The non-transitory computer readable medium of claim 16, wherein the processor to retrieve the electronic file from the remote server further comprises the processor to:
    receive the electronic file page-by-page from the remote server as a user reads a page on a display of the MFD.

* * * * *